(12) United States Patent
Ogawa

(10) Patent No.: US 6,701,734 B1
(45) Date of Patent: Mar. 9, 2004

(54) VEHICULAR AIR CONDITIONING DEVICE AND CONTROL METHOD THEREOF

(75) Inventor: Noriko Ogawa, Nishikamo-gun (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/421,800

(22) Filed: Apr. 24, 2003

(51) Int. Cl.⁷ ................................................ B60H 1/32
(52) U.S. Cl. ............................ 62/244; 62/133; 62/186
(58) Field of Search ........................ 62/244, 186, 208, 62/133; 236/51

(56) References Cited

U.S. PATENT DOCUMENTS

| 5,820,020 A | * | 10/1998 | Sunaga et al. | 236/49.3 |
| 5,906,541 A | * | 5/1999 | Mizuno | 454/75 |
| 5,908,154 A | * | 6/1999 | Sunaga et al. | 236/49.3 |
| 6,027,032 A | * | 2/2000 | Aoki et al. | 237/12.3 R |
| 6,079,485 A | * | 6/2000 | Esaki et al. | 165/43 |
| 6,351,957 B2 | * | 3/2002 | Hara | 62/133 |
| 6,357,242 B1 | * | 3/2002 | Farley et al. | 62/133 |
| 6,367,270 B2 | * | 4/2002 | Niimi et al. | 62/133 |
| 6,367,271 B2 | * | 4/2002 | Forrest et al. | 62/186 |

FOREIGN PATENT DOCUMENTS

| JP | 58-178435 | | 11/1983 |
| JP | 401164621 A | * | 6/1989 |
| JP | 410278553 A | * | 10/1998 |
| JP | 2000-104584 A | | 4/2000 |

* cited by examiner

*Primary Examiner*—William C. Doerrler
*Assistant Examiner*—Mohammad M. Ali
(74) *Attorney, Agent, or Firm*—Kenyon & Kenyon

(57) ABSTRACT

An intake port for air for air conditioning in an air conditioning device is switched when an engine is stopped, by forcibly displacing an internal/external air switching door so as to block an external air duct. As a result, an air flow area of the external air duct becomes substantially zero. Accordingly, intake of external air to the air conditioning device as air for air conditioning is inhibited, and it becomes less liable that an air condition (e.g., a temperature) within a passenger compartment will deviate from a required state.

18 Claims, 4 Drawing Sheets

VEHICULAR AIR CONDITIONING DEVICE AND CONTROL METHOD THEREOF

BACKGROUND OF THE INVENTION

1. Field of the Invention

The invention relates to a vehicular air conditioning device and a control method thereof.

2. Description of the Related Art

Conventionally, as an air conditioning device for regulating an air condition (a temperature, or the like) within a passenger compartment of a vehicle, or the like, air conditioning devices have been known such as those disclosed in, for example, Japanese Utility Model Publication No. JP-U-58-178435, or Japanese Patent Laid-Open Publication No. JP-A-2000-104584.

Such air conditioning devices are provided with an internal air duct that intakes air from a passenger compartment, and an external air duct that intakes air from outside of the vehicle. Air is intaken from at least one of these air ducts for air conditioning. In addition, once a temperature of this intaken air has been regulated by a heater core or an evaporator of the air conditioning device, the temperature regulated air is supplied to the passenger compartment by a blower. This allows a temperature of the passenger compartment to reach a required temperature.

However, with this air conditioning device, when heating of the heater core or cooling of the evaporator is executed with a motor of the vehicle as a driving source, temperature regulation of the intaken air for air conditioning ceases to occur along with stopping of the motor. In this state, the supply of temperature regulated air to the passenger compartment for making the temperature of the passenger compartment the required temperature ceases. Accordingly, the temperature within the passenger compartment deviates from the required value.

Moreover, it is conceivable that the heating of the heater core or the cooling of the evaporator could be executed by a driving source that is separate from the motor, when the motor is stopped. However, in the case that an output of such a separate driving source were lower than an output of the motor, the temperature regulation of the intaken air for air conditioning would be inadequate. As a result, even if the heating of the heater core or the cooling of the evaporator were executed using a separate driving source when the motor is stopped, it would not necessarily be possible to maintain the temperature within the passenger compartment at the required value. If the output of the separate driving source were to be insufficient, the temperature within the passenger compartment would deviate from the required value in the same manner as above.

In this way, in the case that heating of the heater core and cooling of the evaporator cease when the motor is stopped, and in the case that heating and cooling is executed by a separate driving source from the motor, the air condition within the passenger compartment deviates from the required condition (the temperature, and the like). In addition, discomfort of an occupant resulting from deviation of the air condition within the passenger compartment from the required condition is also an important consideration.

SUMMARY OF THE INVENTION

It is an object of the invention to provide a vehicular air conditioning device and a control method thereof that can inhibit an air condition of a passenger compartment from becoming a cause of discomfort for an occupant, as the air condition of the passenger compartment of the vehicle deviates from a required condition.

According to a first aspect of the invention, an air conditioning device for a vehicle includes an internal air duct that intakes air from a passenger compartment and an external air duct that intakes air from outside of the vehicle. This air conditioning devices intakes air for use in air conditioning of the passenger compartment from at least one of the internal air duct and the external air duct. Further, the air conditioning device is provided with a temperature regulation device, a change device and a controller. The temperature regulation device regulates a temperature of the air intaken for air conditioning from at least one of the internal air duct and the external air duct. The change device changes a respective air flow area of at least one of the internal air duct and the external air duct. The controller controls the change device such that, when a motor mounted in the vehicle is stopped, an air condition within the passenger compartment becomes less liable to deviate from a required condition.

As a result of the above configuration, when the motor is stopped, the air flow area of at least one of the internal air duct and the external air duct is changed such that the air condition within the passenger compartment becomes less liable to deviate from the required condition. As a result, on occasions when the motor stops, it is possible to inhibit the air condition of the passenger compartment from becoming unpleasant for an occupant, due to the air condition within the passenger compartment deviating from the required condition.

It should be noted that, examples of the air condition within the passenger compartment include a temperature and a humidity within the passenger compartment. Moreover, the control of the change device by the controller when the motor is stopped may be executed during at least one of a time prior to the motor stopping, a time during a stopping process, and a time after the motor has stopped. In addition, as the temperature regulation device, various devices can be suggested. For example, a device that operates with the motor as a driving source; a device that operates using a driving source separate to the motor; or a device that uses the motor as a driving source, as well as using a separate driving source when the motor is stopped may be adopted.

According to the first aspect of the invention, it may be possible for the controller to control the change device such that the air condition within the passenger compartment more easily changes toward the required condition, when the motor starts.

As a result of this configuration, when the motor starts, the air flow area of at least one of the internal air duct and the external air duct is changed such that the air condition within the passenger compartment more easily changes toward the required condition. Due to this, it is possible to inhibit the air condition within the passenger compartment from becoming unpleasant for the occupant, as a result of the air condition within the passenger compartment deviating from the required condition when the motor starts.

Further, the motor in this case may be a motor that automatically stops and restarts in accordance with an operation state of the vehicle. Moreover, the control of the change device by the controller when the motor restarts, may be executed during at least one of a time prior to the motor starting, a time during a start process, and a time after the motor has started.

According to the above aspect, the controller may be able to control the change device such that when the motor of the vehicle stops, the air flow area of the external air duct becomes small.

As a result of this configuration, it is possible to control the supply of air intaken from the outside of the vehicle to the passenger compartment via the external air duct. Accordingly, it is possible to inhibit deviation of the temperature within the passenger compartment from the required value due to this intaken air.

Moreover, from the point of view of inhibiting deviation of the temperature within the passenger compartment from the required value, it is preferable that the air flow area of the external air duct is changed so as to be substantially zero when the motor of the vehicle stops.

According to the above aspect, the controller may be able to control the change device such that the air flow area of the internal air duct becomes large when the motor of the vehicle stops.

As a result of this configuration, when the motor stops, among the air that is supplied to the passenger compartment, a proportion of the air that is intaken from the passenger compartment increases, and a proportion of the air that only circulates within the vehicle increases. In addition, as a result of regulation of the temperature of the air that only circulates within the vehicle by the temperature regulation device, it becomes easier to more effectively inhibit deviation of the temperature within the passenger compartment from the required value, along with stopping of the motor.

Moreover, from the point of view of maintaining the temperature within the passenger compartment, it is preferable that in the case that air intaken via the internal air duct for air conditioning is temperature regulated by the temperature regulator, the air flow area of the internal air duct is changed to a maximum value, when the motor of the vehicle stops.

According to the above aspect, the temperature regulation device may be a device that operates even when the motor is stopped. Further, the controller may be able to execute control of the change device based on a condition that one of a cooling requirement and a heating requirement of the passenger compartment is high.

As a result of this configuration, when the motor stops, it is possible to prevent the respective area flow areas of the internal air duct and the external air duct from being changed unnecessarily by the change device.

According to the above aspect, the temperature regulation device may be a device that does not operate when the motor is stopped. Moreover, the controller may control the change device such that, when the temperature regulation device stops operating along with stopping of the motor, the air flow area of the external air duct becomes large at the same time as the air flow area of the internal duct becomes small, based on a condition that the temperature within the passenger compartment is both higher than a required value and higher than a temperature of the air outside the vehicle.

In a state in which the temperature of the air within the passenger compartment is both higher than the required value and higher than the temperature of the air outside the vehicle, the temperature of the air outside of the vehicle is closer to the required value than the temperature of the air within the passenger compartment. According to the aforementioned configuration, when this state exists, the air flow area of the external air duct is increased, at the same time as the air flow area of the internal air duct is reduced. As a result, it becomes easier to supply air from the outside of the vehicle to the passenger compartment, and thus it becomes easier to inhibit deviation of the temperature within the passenger compartment from the required value.

According to the aforementioned aspect, the temperature regulation device may be a device that operates when the motor stops or when the motor starts. Further, on occasions when the change device is controlled by the controller along with when the motor stops or when the motor starts, it is possible for temperature regulation of the air for air conditioning to be executed such that the temperature of the air supplied to the passenger compartment does not fluctuate.

Along with control of the change device, the proportion of air from the internal air duct and the proportion of the air from the external air duct among the air for air conditioning change. As a result, the temperature of the air for air conditioning supplied to the passenger compartment becomes more liable to fluctuate. However, according to the above configuration, the temperature of the air for air conditioning is temperature regulated by the temperature regulation device such that fluctuations do not occur in the temperature of the air in this way. As a result, it is possible to prevent the occupant from feeling a sense of displeasure as a result of fluctuations in the temperature of the air.

According to the above aspect, it is possible to provide an air supply unit that executes supply of air to the passenger compartment such that, when the change device is controlled by the controller, an amount of the air supplied to the passenger compartment does not fluctuate along with this control.

When the proportion of air from the internal air duct and the proportion of the air from the external air duct among the air for air conditioning change along with control of the change device, the amount of the air for air conditioning supplied to the passenger compartment becomes more liable to fluctuate. However, according to the above configuration, the amount of the air for air conditioning supplied to the passenger compartment is regulated by the air supply unit such that fluctuations do not occur in the amount of the air in this way. As a result, it is possible to prevent the occupant from feeling a sense of displeasure due to fluctuations in the amount of air.

According to a second aspect of the invention, a control method is provided for an air conditioning device for a vehicle having an internal air duct that intakes air of a passenger compartment, an external air duct that intakes air from outside of the vehicle, a temperature regulation device that regulates a temperature of air intaken for air conditioning from the internal air duct or the external air duct, and a change device that changes a respective air flow area of the internal air duct or the external air duct. This control method includes the step of controlling the change device such that, when a motor mounted in the vehicle is stopped, an air condition within the passenger compartment becomes less liable to deviate from a required condition.

DETAILED DESCRIPTION OF THE PREFERRED EMBODIMENTS

Hereinafter, a first embodiment in which the invention is applied to an air conditioning device of a vehicle having a power source that automatically stops and restarts, will be explained with reference to FIGS. 1 to 3.

Figure 1:
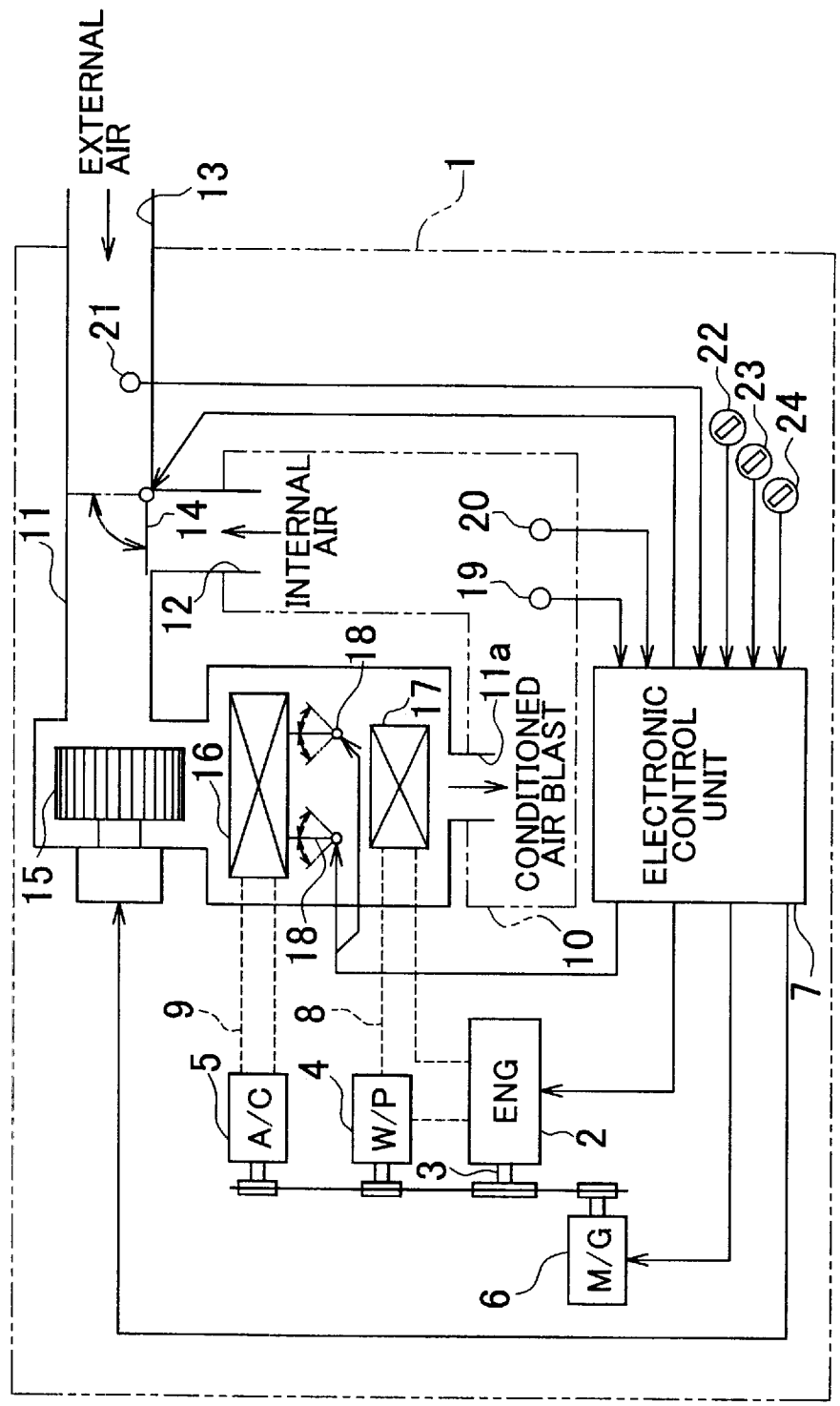
FIG. 1 is a schematic view showing a vehicle to which an air conditioning device according to an embodiment is applied.
Figure 2:
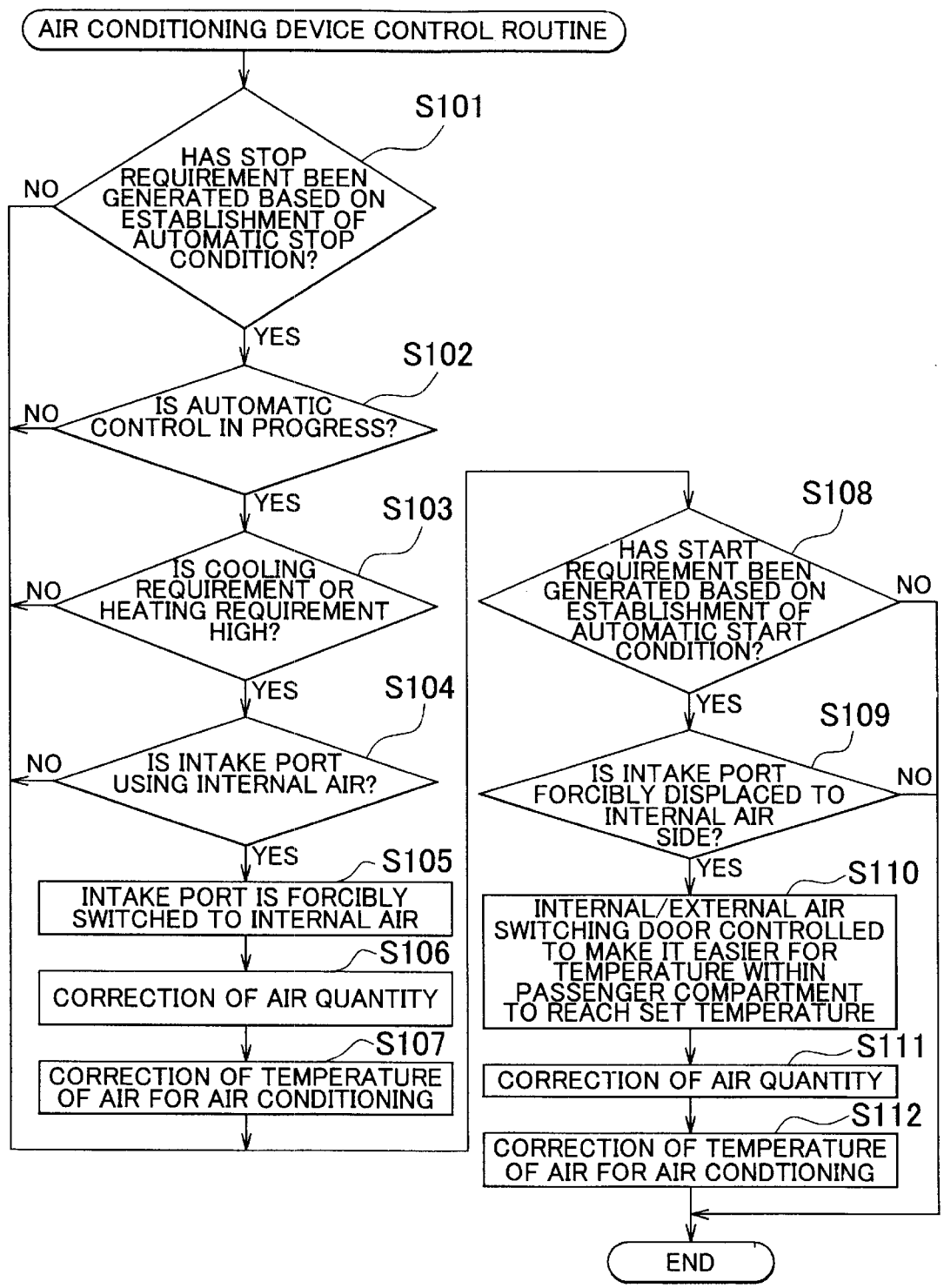
FIG. 2 is a flow chart showing a control procedure of the air conditioning device when an engine is automatically stopped.

As shown in FIG. 1, in a vehicle 1, a water pump 4 that circulates coolant of an engine 2, which is a motor, to an output shaft 3 of the engine 2, and a compressor 5 for air conditioning are coupled. Further, the water pump 4 and the compressor 5 are coupled with a motor generator 6. In addition, an operation control of the engine 2 and a driving control of the motor generator 6 are executed by an electronic control unit 7 mounted in the vehicle 1.

The electronic control unit 7 automatically stops and restarts the engine 2 in accordance with an operation state of the vehicle 1. In other words, for example, if a brake pedal (not shown) is depressed when the vehicle I is stopped, and if there is no requirement for the engine 2 to be driven (hereinafter referred to as "drive requirement"), or the like, an automatic stop condition of the engine 2 is established. If based on this a stop requirement of the engine 2 is generated, the electronic control unit 7 automatically stops the engine 2. Further, if depression of the brake pedal is released, or the drive requirement of the engine 2 is generated, or the like, when the engine 2 is automatically stopped, an automatic start condition of the engine 2 is established. If based on this a restart requirement of the engine 2 is generated, the electronic control unit 7 restarts the engine 2.

When the engine 2 is operating, the water pump 4 and the compressor 5 are operated based on a rotation of the output shaft 3. In addition, coolant of the engine 2 circulates through a circulation passage 8, based on the operation of the water pump 4. Along with this, refrigerant for air conditioning is cooled by being circulated through a refrigerant passage 9, based on the operation of the compressor 5. On the other hand, if it is necessary to operate the water pump 4 and the compressor 5 when the engine 2 is stopped, the motor generator 6 is driven and controlled by the electronic control unit 7. As a result, the water pump 4 and the compressor 5 can be operated based on this drive of the motor generator 6.

Next, the air conditioning device that regulates the temperature of air within a passenger compartment 10 in the vehicle 1 will be described.

This air conditioning device is provided with an air duct 11 through which air used for air conditioning within the passenger compartment 10 passes. An internal air duct 12 for intake of air (internal) from the passenger compartment 10, and an external air duct 13 for intake of air (external) form outside of the vehicle 1 are formed in an upstream portion of the air duct 11. The internal air duct 12 and the external air duct 13 function as an intake port for air of the air conditioning device. At least one of the internal air and the external air from the air ducts 12 and 13, is intaken to the air conditioning device as air for use in air conditioning.

An internal/external air switching door 14 is provided at a confluence portion of the internal air duct 12 and the external air duct 13. Respective air flow areas of the internal air duct 12 and the external air duct 13 are changed by an opening and closing operation of this internal/external air switching door 14. In addition, when the internal/external air switching door 14 is displaced to a side that blocks the internal air duct 12, the air flow area of the internal air duct 12 reduces, and at the same time, the air flow area of the external air duct 13 increases. Alternatively, when the internal/external air switching door 14 is displaced to a side that blocks the external air duct 13, the air flow area of the external air duct 13 reduces, and at the same time, the air flow area of the internal air duct 12 increases.

Within the air duct 11, a blower 15 is provided at a downstream side of the internal/external air switching door 14. Based on an operation of this blower 15, air for use in air conditioning is fed to the air duct 11 from at least one of the internal air duct 12 and the external air duct 13, and following this, the air is supplied to the passenger compartment 10 from an output vent 11a. Accordingly, it is possible to regulate an amount of air for use in air conditioning supplied to the passenger compartment 10 from the air duct 11, through control of the blower 15. Further, the output vent 11a for air for air conditioning is provided in a plurality at different positions within the passenger compartment 10 (only one of the output vent 11a is shown in FIG. 1). These output vents 11a are configured such that it is possible to volitionally select from among all of the output vents 11a, which of the output vents 11a actually outputs air.

Moreover, an evaporator 16 and a heater core 17 used for cooling and heating the air within the air duct 11 are provided within the air duct 11, at a downstream side of the blower 15. This evaporator 16 includes a plurality of cooling pipes (not shown in the figure) that are a portion of the refrigerant passage 9 through which refrigerant passes. The evaporator 16 executes cooling through heat exchange between the air within the air duct 11 and the refrigerant within the cooling pipes. On the other hand, the heater core 17 includes a plurality of heating pipes (not shown in the figure) that are a portion of the circulation passage 8 through which coolant heated by the engine 2 passes. The heater core 17 executes heating through heat exchange between the air within the air duct 11 and the coolant within the heating pipes.

Further, an air mixing door 18, used in temperature regulation of the air for air conditioning that passes through the air duct 11, is provided within the air duct 11 between the evaporator 16 and the heater core 17. This air mixing door 18 is displaced in order to regulate what proportion of the air that has passed through the evaporator 16 will pass through the heater core 17.

In other words, for example, if the air mixing door 18 is displaced to a position at which air does not pass through the hear core 17, the cooled air that has passed through the evaporator 16 is supplied to the passenger compartment 10 without change. In addition, as the air mixing door 18 is displaced to a side at which an amount of air passing through the heater core 17 increases, the temperature of the air for air conditioning that is supplied to the passenger compartment 10 from the air duct 11 becomes gradually higher.

The aforementioned internavexternal air switching door 14, blower 15 and air mixing door 18 are controlled by the electronic control unit 7. This electronic control unit 7 is connected with an internal temperature sensor 19, a solar radiation amount sensor 20, an external temperature sensor 21, as well as an automatic control switching switch 22, a temperature setting switch 23 and a internal/external air switching switch 24, and the like. The internal temperature sensor 19 detects the air temperature (internal temperature) within the passenger compartment 10; the solar radiation amount sensor 20 detects the amount of solar radiation within the passenger compartment 10; and the external temperature sensor 21 detects a temperature (external temperature) outside of the vehicle 1.

The electronic control unit 7 calculates a required output temperature TAO based on a set temperature (a required temperature) set by the temperature setting switch 23, along with the internal temperature, the solar radiation amount, and the external temperature, and the like. It should be noted that, the required output temperature TAO refers to a temperature of the air output from the output vent 11*a* which is required in order to maintain the temperature within the passenger compartment at the aforementioned set temperature. The electronic control unit 7 displaces the air mixing door 18 such that the temperature of the air output to the passenger cabin 10 from the output vent 11*a* becomes equal to the required output temperature TAO. By doing so, the temperature within the passenger compartment 10 is regulated so as to reach the required value.

Moreover, if an operation position of the automatic control switching switch 22 is set to "Auto", the electronic control unit 7 controls the blower 15, the internal/external air switching door 14, and the like, in accordance with the required output temperature TAO. Accordingly, an automatic control is executed such that a proportion of the amounts of internal air and external air intaken to the air duct 11 as air for air conditioning, the number of the output vents 11*a* from which air for air conditioning is output, which of the output vents 11*a* are used for outputting air, and the amount of air for air conditioning output from the output vents 11*a*, and the like, are automatically changed to an optimum.

On the other hand, if the operation position of the automatic control switching switch 22 is set to "Manual", the electronic control unit 7 controls the blower 15, the internal/external air switching door 14, and the like, in accordance with an operation position of each type of switch, and the like, operated by an occupant of the vehicle 1. Accordingly, a manual control is executed such that a proportion of the amounts of internal air and external air intaken to the air duct 11 as air for air conditioning, the number of output vents 11*a* from which air for air conditioning is output, and the amount of air for air conditioning output from the output vents 11*a*, and the like, are changed in accordance with the requirements of the occupant.

Further, operation of the internal/external air switching door 14 when the manual control is being executed is performed in accordance with the operation position of the internal/external air switching switch 24. More specifically, if the internal/external air switching switch 24 is set to "Fresh" (external air), external air is used as air for air conditioning by displacing the internal/external air switching door 14 to the side that blocks the internal air duct 12, thus increasing the air flow area of the external air duct 13. Moreover, if the internal/external air switching switch 24 is set to "RECIRC" (internal air), internal air is used as air for air conditioning by displacing the internal/external air switching door 14 to the side that blocks the external air duct 13, thus increasing the air flow area of the internal air duct 12.

It should be noted that, when the automatic stop condition of the engine 2 is established, the stop requirement of the engine 2 is generated, and based on this stop requirement the electronic control unit 7 stops the engine 2 automatically. When the engine 2 is stopped in this manner, and the passenger compartment 10 is being cooled down or warmed up, it is necessary to operate the compressor 5 or the water pump 4 in order to execute the cooling of the evaporator 16 or the heating of the heater core 17. As a result, the electronic control unit 7 operates the compressor 5 and the water pump 4 using drive of the motor generator 6, following the generation of the aforementioned stop requirement.

Accordingly, even if the engine 2 is stopped, air within the air duct 11 is cooled by the low temperature refrigerant flowing in the cooling pipes of the evaporator 16. Alternatively, high temperature coolant flowing in the heating pipes of the heater core 17 warms air flowing within the air duct 11. In addition, even when the engine 2 is stopped, air for air conditioning that is temperature regulated by the evaporator 16 and the heat core 17 is supplied to the passenger compartment 10 from the output vent 1*a*, and thus the temperature of the air within the passenger compartment 10 is regulated.

It is important to note that, normally, an output of the motor generator 6 mounted in the vehicle 1 is comparatively smaller than an output of the engine 2. As a result, in order to execute regulation of the temperature of the air for air conditioning when the engine 2 is stopped, even if the compressor 5 and the water pump 4 are operated by drive of the motor generator 6, it is not necessarily the case that the temperature of the air for air conditioning is regulated sufficiently to allow the air within the passenger compartment 10 to reach the required value (the set temperature). In particular, when a cooling requirement or a heating requirement is high, the output of the motor generator 6 is insufficient to operate the compressor 5 or the water pump 4 so as to change the temperature with the passenger compartment 10 to the set temperature. Thus, it becomes more likely that the temperature of the air within the passenger compartment 10 will deviate from the required value.

However, in the case of this embodiment, in light of the aforementioned existing circumstances, when the engine 2 is stopped, the position of the internal/external air switching door 14 is controlled such that the temperature of the air with the passenger compartment 10 becomes less liable to deviate from the set temperature. Namely, the internal/external air switching door 14 is forcibly displaced so as to block the external air duct 13. By changing the air flow area of the external air duct 13 so that it becomes substantially zero, the intake port of the air conditioning device (i.e., of the air duct 11) is forcibly switched to the internal air side.

As a result, intake of external air to the air duct 11 as air for air conditioning is inhibited, and only internal air is intaken to the air duct 11 as air for air conditioning. This internal air is supplied to the passenger compartment 10 following temperature regulation by the evaporator 16 or the heater core 17. In this way, when the engine 2 is stopped, circulation of air for air conditioning is executed using only air within the vehicle 1. As well as this, since the circulated air is temperature regulated, it is possible to decrease the output of the motor generator 6 that is necessary to change the temperature of the passenger compartment 10 to the set temperature to a low level.

Accordingly, even if the output of the motor generator 6 is less than the output of the engine 2, it is possible to control the output of the motor generator 6 such that the output does not become insufficient for operating the compressor 5 and the water pump 4 so as to change the temperature within the passenger compartment 10 to the set temperature. In addition, it is also possible to control the temperature within the passenger compartment 10 such that the temperature does not become liable to deviate from the set temperature along with output insufficiency of the motor generator 6, when the engine 2 is stopped.

Figure 3:
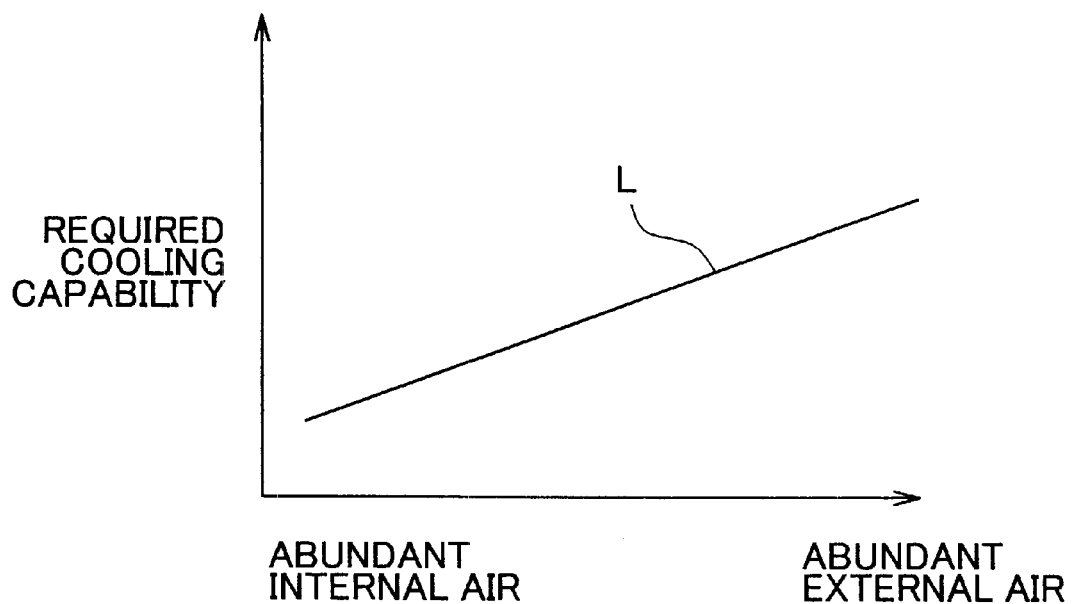
FIG. 3 is a graph showing how a cooling capability necessary for cooling a temperature of a passenger compartment to a constant temperature changes, when a proportion of internal air to external air among air that is intaken for air conditioning is changed.

Next, it should be noted that, when the proportion of internal air and external air within the air intaken for air conditioning is changed, a cooling capability required for cooling the air within the passenger compartment 10 to the set temperature changes in the manner shown by a solid line L shown in FIG. 3.

As is clearly apparent from the figure, the cooling capability required becomes larger as the proportion of external air within the air intaken for air conditioning increases. As a result, as the figure makes clear, if only internal air is intaken to the air duct 11 as air for air conditioning when the compressor 5 is operated by the motor generator 6 along with automatic stopping of the engine 2, as described above, it is possible to control the output of the motor generator 6 so that it does not become insufficient from the point of view of cooling the temperature of the air within the passenger compartment 10 to the set temperature.

Next, a control procedure for the air conditioning device when the engine 2 is automatically stopped will be explained with reference to a flow chart of FIG. 2 that shows a control routine for the air conditioning device. Processing of this air conditioning device control routine is executed using the electronic control unit 7, for example, with an interrupt at each of a predetermined time.

In the air conditioning device control routine, first, it is determined whether or not a state exists in which the intake port of the air conditioning device needs to be forcibly switched to the internal air side. Namely, it is determined whether the internal/external air switching door 14 needs to be forcibly displaced to the side that blocks the external air duct 13. This determination is executed based on the following determinations: a determination as to whether the stop requirement of the engine 2 has been generated based on establishment of the automatic stop condition (step S101); a determination as to whether the automatic control is being executed (step S102); a determination as to whether the cooling requirement or the heating requirement is high (step S103); and a determination as to whether the air intaken to the air conditioning device is internal air (step S104).

In addition, if the determinations of all of the above steps S101 to S104 are positive, it is determined that the state exists in which the intake port of the air conditioning device needs to be forcibly switched to the internal air side. Accordingly, the intake port is switched to the internal air side (step S105). In other words, the internal/external air switching door 14 is forcibly displaced to the side that blocks the external air duct 13, and the air flow amount of the external air duct 13 is substantially reduced to zero, and at the same time, the air flow amount of the internal air duct 12 is increased to a maximum. By executing switching of the intake port in this way, the internal/external air switching door 14 is maintained at the displacement at which the air flow area of the external air duct 13 is substantially zero, from just before automatic stopping of the engine 2, through the stopping process, until after stopping is completed.

On the other hand, in the case that it is determined that the automatic control is not being executed due to the determination of step S102 being negative, the forcible switching of the intake port to the internal air side is not executed as described above. This is because it is preferable to prioritize the desire of the occupant of the vehicle 1 when the manual control is being executed rather than the automatic control. Accordingly, since the aforementioned switching of the intake port may conflict with the desire of the occupant, it is preferable that the switching is not executed. Further, the determination as to whether automatic control is being executed is executed based on, for example, whether the operation position of the automatic control switching switch 22 is set to "Auto" or "Manual".

Moreover, also, in the case that it is determined that the cooling requirement or the heating requirement is not high due to the determination of the step S103 being negative, the forcible switching of the intake port to the internal air side is not executed as described above. The reason for this is that, when the cooling requirement or the heating requirement is not high, even if the intake port is not forcibly switched to the internal air side as described above, it is possible to control the temperature of the air within the passenger compartment 10 such that the temperature does not deviate from the set temperature. Further, it is possible to determine whether the cooling requirement or the heating requirement is high, based on, for example, the external air temperature, the required output temperature TAO, and which of the output vents 11a is selected for use as an output vent for outputting the air for conditioning, More specifically, when the external temperature is high, when the required output temperature TAO is low, or when the output vent 11a that is selected as the output vent for air for air conditioning is one that blows air directly at the occupant, or the like, it is possible to determine that the cooling requirement is high. On the contrary, when the external air temperature is low, or when the required output temperature TAO is high, or the like, it is possible to determine that the heating requirement is high.

In the case that the internal/external air switching door 14 is forcibly displaced to the side that blocks the external air duct 13, along with this, the amount of air (air quantity) for air conditioning supplied to the passenger compartment 10 from the output vent 11a is corrected using control of the blower 15 such that the amount of air does not fluctuate (step S106). For example, when the maximum value of the air flow area of the internal air duct 12 is larger than a maximum value of the air flow area of the external air duct 13, and when the internal/external air switching door 14 is forcibly displaced as described above, the amount of air is corrected toward a reduced amount by the blower 15.

Further, at the time of displacement of the internal/external air switching door 14, the temperature of the air for air conditioning supplied to the passenger compartment 10 from the output vent 11a is corrected along with the displacement, by control of the air mixing door 18 such that the temperature of the air does not fluctuate (step S107). For example, when the air intaken for air conditioning is switched from external air to internal air along with forcible displacement of the internal/external air switching door 14 during cooling, the temperature of the air for air conditioning supplied to the passenger compartment 10 from the output vent 11a is corrected by control of the air mixing door 18 such that the temperature rises.

Moreover, in the air conditioning device control routine, a determination is executed as to whether or not a state exists in which the forcible displacement of the intake port to the internal air side needs to be released. This determination is executed based on the following determinations: a determination as to whether the start requirement of the engine 2 has been generated based on establishment of the automatic start condition (step S108); and a determination as to whether the intake port is forcibly displaced to the internal air side (step S109).

When the determinations of steps S108 and S109 are both positive, it is determined that a state exists in which the forcible displacement of the air input port of the air conditioning device to the internal air side needs to be released. Along with the release of this state, when the engine 2 starts operation, the internal/external air switching door 14 is controlled such that the temperature within the passenger compartment 10 is more easily able to reach the set temperature (step S110). As a result, the internal/external air switching door 14 is controlled in the manner described above from just before the engine 2 starts operation, through the starting process, until after starting has been completed. Further, as a control mode of the internal/external air switching door 14 controlled in this way, it is possible to adopt, for example, a control mode in which, as the difference between the internal air temperature and the set temperature becomes larger, the internal/external air switching door 14 is displaced to the side at which the air flow area of the internal air duct 12 becomes larger.

When the internal/external air switching door 14 is controlled in the above described manner, along with this, the amount of air (air quantity) for air conditioning supplied to the passenger compartment 10 from the output vent 11a is corrected using control of the blower 15, such that the amount of air does not fluctuate (step S111). For example, when the maximum value of the air flow area of the external air duct 13 is smaller than the maximum value of the air flow area of the internal air duct 12, and when the internal/external air switching door 14 is displaced to the side at which the air flow area of the external air duct 13 is at the maximum, the amount of air is corrected toward an increased amount by the blower 15.

Further, when executing control of the internal/external air switching door 14 in order to allow the temperature of the passenger compartment 11 to easily reach the set temperature, the temperature of the air for air conditioning supplied to the passenger compartment 10 from the output vent 11a is corrected along with this control, by control of the air mixing door 18 such that the temperature of the air does not fluctuate (step S112). For example, when the air for air conditioning is switched from internal air to external air along with control of the internal/external air switching door 14 during cooling, the temperature of the air supplied to the passenger compartment 10 from the output vent 11a is corrected by control of the air mixing door 18 such that the temperature falls.

According to the aforementioned embodiment, the following effects can be obtained.

(1) When the engine 2 is stopped, the internal/external air switching door 14 is forcibly displaced so as to block the external air duct 13, and thus the air flow area of the external air duct 13 becomes substantially zero, and the air flow area of the internal air duct 12 becomes the maximum value. As a result, intake of external air to the air duct 11 as air for air conditioning is inhibited, and thus only internal air is intaken to the air duct 11 as air for air conditioning. Accordingly, internal air is supplied to the passenger compartment 11 following temperature regulation. In this state, only air for air conditioning circulated within the vehicle 1 is temperature regulated, and as a result, because the temperature of the air within the passenger compartment 10 is regulated so as to become the set temperature (the required value), it is possible to effectively inhibit deviation of the temperature of the air within the passenger compartment 10 from the set temperature.

(2) The forcible displacement of the internal/external air switching door 14 to the side at which the external air duct 13 is blocked, along with stopping of the engine 2, is executed on the condition that the cooling requirement or the heating requirement is high. As a result, if the cooling requirement or the heating required is small, the forcible displacement is not executed. Accordingly, it is possible to prevent the respective air flow areas of the external air duct 13 or the internal air duct 12 from being changed, due to unnecessary forcible displacement of internal/external air switching door 14.

(3) When the internal/external air switching door 14 is controlled along with automatic stopping and restart of the engine 2, the proportion of internal air to external air among the air for air conditioning intaken to the air duct 11 is changed. As a result, the temperature of the air for air conditioning supplied to the passenger compartment 10 from the output port 11a becomes liable to fluctuate. However, the air mixing door 18, which is provided in order to inhibit fluctuations like this of the air temperature, is controlled and the temperature of the air for air conditioning that is output from the output vent 11a is corrected. Accordingly, it is possible to prevent the occupant from feeling any sense of discomfort due to fluctuations in air temperature.

(4) When the internal/external air switching door 14 is controlled along with automatic stopping and restart of the engine 2, and when the intake port for the air of the air conditioning device is switched between the internal air side and the external air side, there is a difference between the respective maximum values of the air flow amounts of the internal air duct 12 and external air duct 13. Due to this difference, and the like, the amount of air for air conditioning supplied to the passenger compartment 10 from the output port 11a becomes liable to fluctuate. However, through control of the blower 15, which is provided in order to inhibit fluctuations of the amount of air, like this, the amount of air for air conditioning output from the output vent 11a is corrected. Accordingly, it is possible to prevent the occupant from feeling any sense of discomfort due to fluctuations in the amount of air.

In should be noted that this embodiment can be modified, for example, in the following ways.

When the internal/external air switching door 14 is forcibly displaced to the side at which the external air duct 13 is blocked along with automatic stopping of the engine 2, determination of whether to actually execute this displacement may be intaken accordance with, for example: whether a concentration of exhaust gas included in the external air is high, due to driving on a congested road, or the like; or whether the occupant of the passenger compartment 10 is smoking, or the like.

In the embodiment, respective fluctuations in the temperature and the amount of the air for air conditioning output from the output vent 11a are inhibited along with control of the internal/external air switching door 14. However, it is not essential that inhibition of fluctuations like this be executed.

Moreover, the invention is applied to an air conditioning device in which temperature regulation of air for air conditioning intaken to the air duct 11 is possible even when the engine 2 is stopped, due to operation of the compressor 5 and the water pump 4. However, the invention may be applied to an air conditioning device in which the compressor 5 and the water pump 4 become inoperable when the engine 2 stops. In this case, when the temperature within the passenger compartment 10 becomes equal to the required value, and when the engine 2 stops, it is preferable that the internal/external air switching door 14 is forcibly displaced to the side at which the external air duct 13 is blocked. However, when the temperature within the passenger compartment 10 is higher than the set temperature and higher than the external air temperature, it is preferable that the internal/external air switching door 14 is forcibly displaced to the side at which the internal air duct 12 is blocked. By doing so, the air flow area of the internal air duct 12 is reduced (e.g., to zero), and along with this, the air flow area of the external air duct 13 is increased (e.g., to the maximum). This is executed because, from the point of view of making it difficult for the temperature within the passenger compartment 10 to deviate from the set temperature, it is more beneficial to feed external air to the passenger compartment 10 when the circumstances described above pertain.

When the engine 2 is restarted, the respective air flow areas of the internal air duct 12 and the external air duct 13 are changed through control of the internal/external air switching door 14, so as to make it easier for the temperature within the passenger compartment 10 to reach the set temperature. However, it is not essential to execute control of the internal/external air switching door 14 when the engine 2 is restarted, in this manner. For example, when the engine 2 is restarted, the internal/external air switching door 14 may be returned to its position prior to when the engine 2 was automatically stopped, thus returning the respective air flow areas of the internal air duct 12 and the external air duct 13 to their state prior to automatic stopping of the engine 2.

Figure 4:
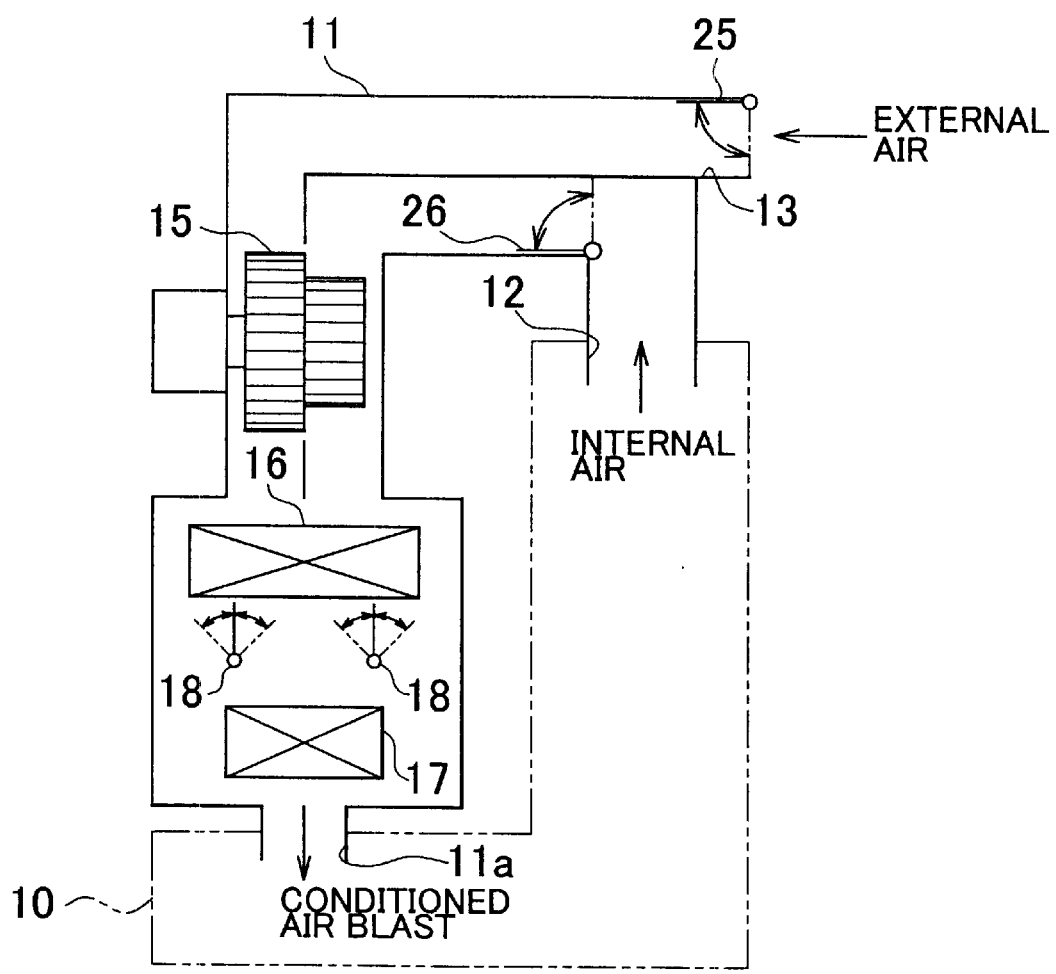
FIG. 4 is a schematic view of another embodiment of an air conditioning device according to the invention.

Further, the respective air flow areas of the internal air duct 12 and the external air duct 13 are changed using a single internal/external air switching door 14. However, in contrast to this, the respective air flow areas of the internal air duct 12 and the external air duct 13 may be changed separately. In this case, as shown in FIG. 4, an internal air door 26 for changing the air flow area of the internal air duct 12, and an external air door 25 for changing the air flow area of the external air duct 13 may be provided. In this way, by providing the internal air door 26 and the external air door 25, it becomes possible to change the air flow area of the internal air duct 12 and the air flow area of the external air duct 13 independently.

The invention is applied to the vehicle 1 in which the engine 2 automatically stops and restarts. However, the invention may be applied to a vehicle in which an engine is mounted that does not execute automatic stopping and restarting in this way.

What is claimed is:

1. An air conditioning device for a vehicle comprising:
   an internal air duct that intakes air from a passenger compartment;
   an external air duct that intakes air from outside of the vehicle;
   a temperature regulation device that regulates a temperature of air intaken for air conditioning from at least one of the internal air duct and the external air duct;
   a change device that changes a respective air flow area of at least one of the internal air duct and the external air duct; and
   a controller that controls the change device such that, when a motor mounted in the vehicle is stopped, an air condition within the passenger compartment becomes less liable to deviate from a required condition.

2. The air conditioning device according to claim 1, wherein the air condition within the passenger compartment is one of a temperature and a humidity within the passenger compartment.

3. The air conditioning device according to claim 1, wherein the control of the change device by the controller when the motor is stopped is executed during at least one of a time prior to the motor stopping, a time during a stopping process, and a time after the motor has stopped.

4. The air conditioning device according to claim 1, wherein the temperature regulation device is operated using at least one of the motor and a motor/generator mounted in the vehicle as a driving source.

5. The air conditioning device according to claim 1, wherein the controller controls the change device such that, when the motor starts, the air condition within the passenger compartment more easily changes toward the required condition.

6. The air conditioning device according to claim 1, wherein the motor automatically stops and restarts in accordance with a running condition of the vehicle.

7. The air conditioning device according to claim 6, wherein the control of the change device by the controller when the motor restarts, is executed during at least one of a time prior to the motor restarting, a time during a restart process, and a time after the motor has restarted.

8. The air conditioning device according to claim 1, wherein the controller controls the change device such that, when the motor of the vehicle stops, the air flow area of the external air duct becomes small.

9. The air conditioning device according to claim 8, wherein the controller controls the change device such that, when the motor of the vehicle stops, the air flow area of the external air duct becomes substantially zero.

10. The air conditioning device according to claim 1, wherein the controller controls the change device such that, when the motor of the vehicle stops, the air flow area of the internal air duct becomes large.

11. The air conditioning device according to claim 10, wherein the controller controls the change device such that, when the motor of the vehicle stops, the air flow area of the internal air duct becomes a maximum value.

12. The air conditioning device according to claim 1, wherein:
   the temperature regulation device operates even when the motor is stopped; and
   the controller executes control of the change device based on a condition that one of a cooling requirement and a heating requirement of the passenger compartment is high.

13. The air conditioning device according to claim 1, wherein:
   the temperature regulation device does not operate when the motor is stopped; and
   the controller controls the change device such that, when the temperature regulation device stops operating along with stopping of the motor, the air flow area of the external air duct becomes large at the same time as the air flow area of the internal duct becomes small, based on a condition that the temperature within the passenger compartment is both higher than a required value and higher than a temperature outside the vehicle.

14. The air conditioning device according to claim 1, wherein:
   the temperature regulation device operates at one of a time when the motor stops and a time when the motor starts, and
   the temperature regulation of the air for air conditioning is such that, when the change device is controlled by the controller along with one of when the motor stops and when the motor starts, the temperature of the air supplied to the passenger compartment does not fluctuate.

15. The air conditioning device according to claim 1, further comprising:
   an air supply unit that executes supply of air to the passenger compartment such that, when the change device is controlled by the controller, an amount of the air supplied to the passenger compartment does not fluctuate along with the control of the change device.

16. The air conditioning device according to claim 1, wherein the controller controls the change device such that, when the motor starts, one of the air flow area of the internal air duct and the air flow area of the external air duct returns to a state prior to stopping of the motor.

17. The air conditioning device according to claim 1, wherein:

the change device is provided with an internal air change device for changing the air flow area of the internal air duct, and an external air change device for changing the air flow area of the external air duct; and the change device changes the air flow area of the internal air duct and the air flow area of the external air duct independently.

18. A control method of an air conditioning device for a vehicle having an internal air duct that intakes air from a passenger compartment, an external air duct that intakes air from outside of the vehicle, a temperature regulation device that regulates a temperature of air intaken for air conditioning from at least one of the internal air duct and the external air duct, and a change device that changes a respective air flow area of at least one of the internal air duct and the external air duct, comprising the step of:

controlling the change device such that, when a motor mounted in the vehicle is stopped, an air condition within the passenger compartment becomes less liable to deviate from a required condition.

* * * * *